(No Model.) 3 Sheets—Sheet 1.
H. K. HESS.
CHEMICAL ELECTRIC GENERATOR.
No. 592,782. Patented Nov. 2, 1897.
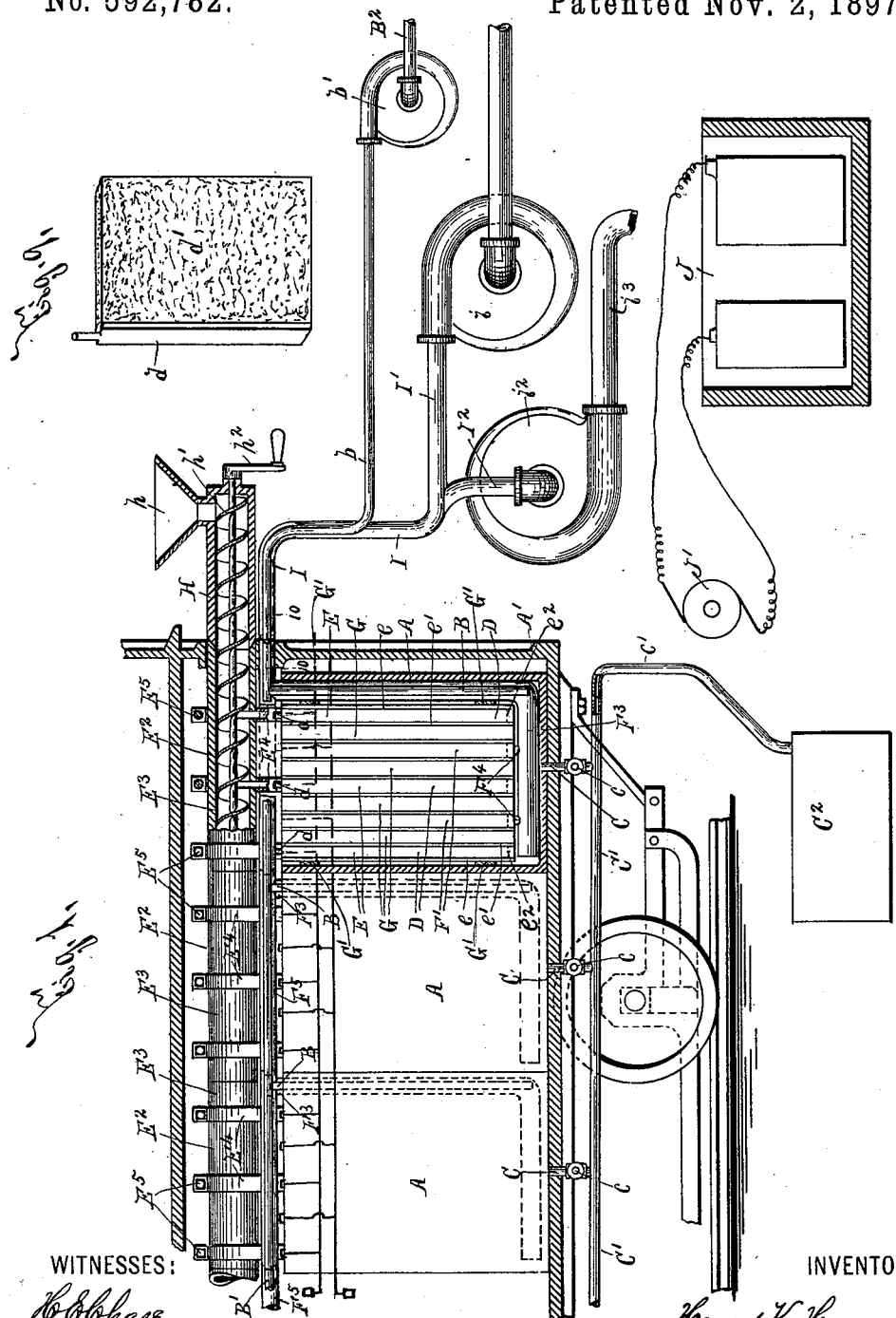
WITNESSES:
H. E. Chase
C. Schornick
INVENTOR
Henry K. Hess.
BY
Hoyt, Wilkinson & Parsons
ATTORNEYS.

(No Model.) 3 Sheets—Sheet 2.
H. K. HESS.
CHEMICAL ELECTRIC GENERATOR.
No. 592,782. Patented Nov. 2, 1897.
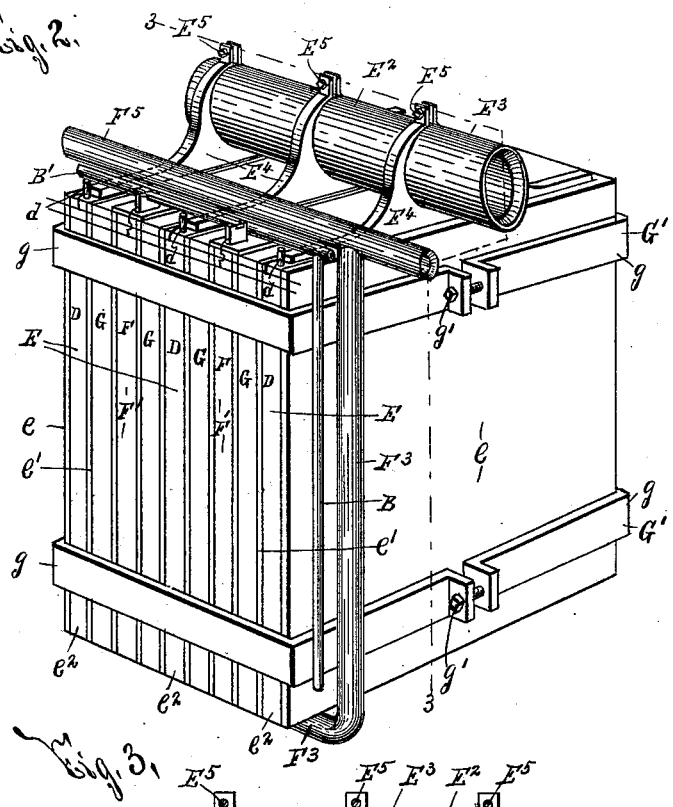
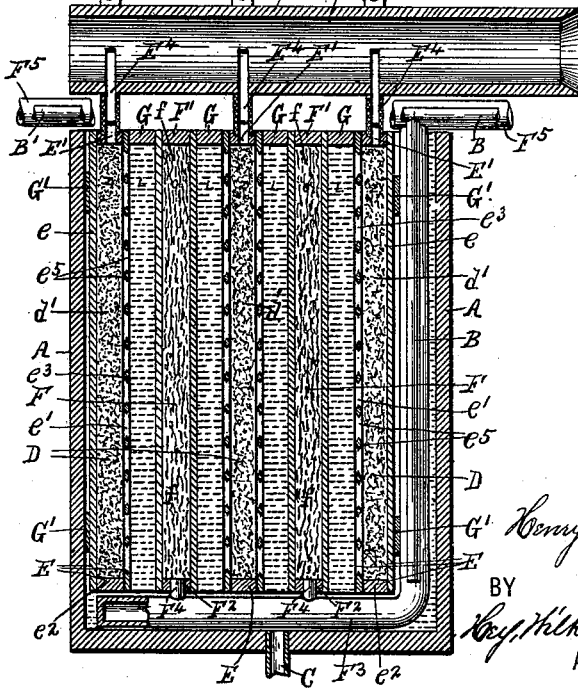
WITNESSES:
INVENTOR
Henry K. Hess,
BY
ATTORNEYS,

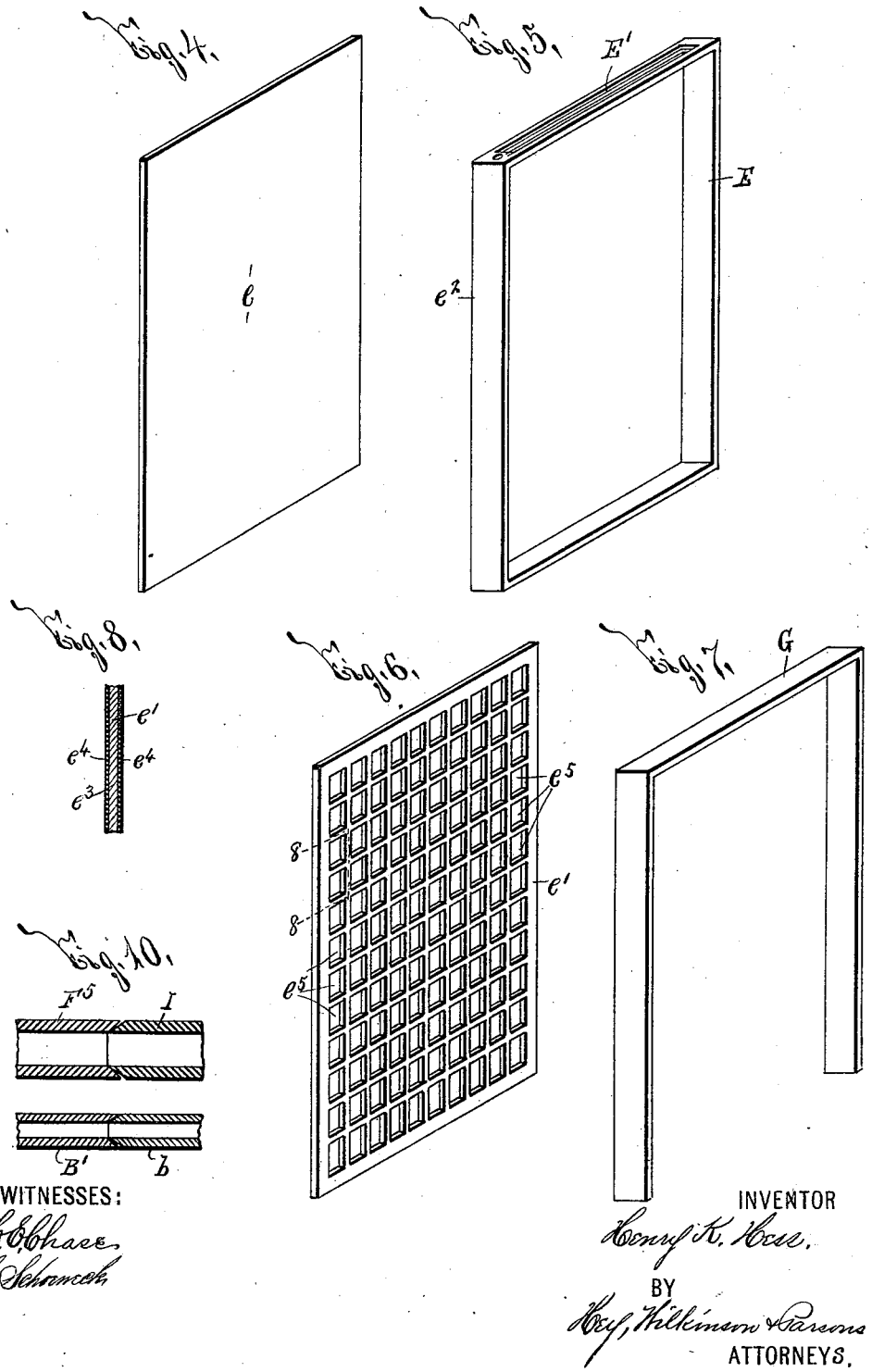

UNITED STATES PATENT OFFICE.

HENRY K. HESS, OF SYRACUSE, NEW YORK.

CHEMICAL-ELECTRIC GENERATOR.

SPECIFICATION forming part of Letters Patent No. 592,782, dated November 2, 1897.

Application filed May 7, 1894. Serial No. 510,296. (No model.)

*To all whom it may concern:*

Be it known that I, HENRY K. HESS, of Syracuse, in the county of Onondaga, in the State of New York, have invented new and useful Improvements in Chemical-Electric Generators, of which the following, taken in connection with the accompanying drawings, is a full, clear, and exact description.

My invention relates to chemical-electric generators, and has for its object the production of a simple and practical device which is highly efficient in use; and to this end the invention consists, essentially, in the general combination, construction, and arrangement of the component parts of a chemical-electric generator, all as hereinafter fully described, and pointed out in the claims.

In describing this invention reference is had to the accompanying drawings, forming a part of this specification, in which like letters indicate corresponding parts in all the views.

Figure 1 is an elevation, partly in section, of a portion of a vehicle, my chemical-electric generator shown as operatively mounted within the vehicle, means for inserting the material within the chemical-electric generator for effecting the discharge of the current and for withdrawing the material chemically changed during the discharge of the current, and means for rechanging or restoring material chemically changed during the operation of said chemical-electric generator, the electric generator for aiding in effecting this result being diagrammatically illustrated. Fig. 2 is an isometric perspective of the inclosing supports and supporting electrical conductors of the electrodes of one of the cells of my chemical-electric generator or battery and the conduits for conducting suitable material to the inclosing supports and for conducting and withdrawing material to and from the supporting electrical conductors. Fig. 3 is a vertical sectional view taken on line 3 3, Fig. 2, the cell and the means for inserting and withdrawing the electrolyte being shown in their operative position with reference to the parts illustrated at Fig. 2. Figs. 4, 5, and 6 are isometric views of the parts comprising the inclosing support for one of the end electrodes, the perforations of the outer wall of said support being shown as not filled. Fig. 7 is an isometric view of one of the insulating pieces or frames interposed between the inclosing support of the electrodes and the electrical conductor for the next adjacent electrode. Fig. 8 is a detail sectional view taken on line 8 8, Fig. 6. Fig. 9 is an isometric view of one of the electrodes of my chemical-electric generator or battery, and Fig. 10 is a horizontal sectional view taken on line 10 10, Fig. 1.

A represents the outer casing or shell of one of the cells of my chemical-electric generator or battery, which casing is composed of suitable non-electric-conducting material, as glass, hard rubber, &c., and is illustrated at Fig. 1 as operatively mounted within a portion of a vehicle, as a street-railway car A', unnecessary to describe herein. The casing or shell A contains a suitable electrolyte and the elements of the cell. The electrolyte preferably consists of water mixed with a suitable amount of zinc sulfate and is arranged by means of a conduit B, having one extremity inserted within the casing A and its other extremity extended outwardly therefrom. A suitable outlet passage or pipe C, opening from the casing A and provided with a valve $c$, withdraws the electrolyte, chemically changed by the discharge of the chemical-electric generator or battery, and any other material discharged thereinto by the action of said generator or battery. As my improved chemical-electric generator or battery preferably consists of a number of cells, the pipes B C of each cell are connected to corresponding main pipes B' C', each usually consisting of a series of separate sections detachable from each other for preventing short-circuiting of the generator.

Insertion and withdrawal of the electrolyte preferably take place at a suitable station provided with a feeding pipe or conduit $b$ and a drain or outlet pipe or conduit $c'$. One end of the pipe or conduit $b$ is adapted to be detachably connected to the outer end of the pipe B', and its other end is connected to any desirable suitable pressure device, as a pump $b'$, connected to an inlet-pipe B², and one extremity of the pipe or conduit $c'$ is adapted to be detachably connected to the pipe C', and its opposite extremity extends to a reservoir or receptacle C², of any suitable construction.

At Fig. 10 I have illustrated the outer end of the pipe or conduit $b$ as tapered or pointed and the adjacent end of the pipe or conduit B′ as correspondingly formed to receive said end of the pipe $b$ for making a tight joint therewith. The adjacent ends of the pipes or conduits $c'$ C′ may be formed similarly to the adjacent ends of the pipes or conduits $b$ B′. It will be understood, however, that any desirable means may be used for effecting a practical connection of the pipes $b\ c'$ B′ C′ and that the adjacent ends of the corresponding pipes may be suitably formed to attain this result.

Each cell of my improved chemical-electric generator or battery is provided with any suitable number of electrodes D F, which I will immediately describe, and these electrodes are connected in any desirable manner to each other and to the electrodes in the other cells.

Each of the positive electrodes D, Fig. 9, of my chemical-electric generator usually consists of a suitable electrical conductor $d$ and a body $d'$ of metal amalgam or other suitable active material electrically connected to the bar $d$, which is preferably arranged at one side of the body $d'$ and engages its adjacent edge. The body $d'$ preferably consists of an amalgam of zinc and mercury, and if a considerable amount of mercury is used said body is semifluid. If a less amount of the mercury is used, the body $d'$ is comparatively hard and may consist of a mass of granules or particles produced by grinding the amalgam before forming it into said body $d'$.

The positive electrodes D are preferably arranged within the inner chambers of inclosing supports E, which may be composed of hard rubber or other suitable non-electric-conducting material and prevent undue escape of the amalgam forming part of said electrodes, and although these supports may be of any suitable construction for permitting access of the electrolyte to the electrodes D they each preferably consist of opposite plates $e\ e'$ and an interposed substantially rectangular piece or frame $e^2$. The plates $e\ e'$ are here illustrated, Fig. 8, as consisting of a body $e^3$ of aluminium or similar material and an outer coating $e^4$ of non-electric-conducting material, as hard rubber, but said plates may be formed of a suitable porous non-electric-conducting material, as porcelain. When constructed of a single body or frame of aluminium or similar material provided with an insulating-coating, the opposite plates of the inclosing supports E are formed with perforations $e^5$ for permitting entrance of the electrolyte to the inner chambers of said supports. The perforations $e^5$ may be closed by a suitable non-electric-conducting porous filling, as quartz-sand, held together by any desirable cement, as asphalt, and, if desired, the outer plates of the end supports E may be unprovided with perforations for increasing the rigidity of the outer supports.

In the operation of my chemical-electric generator or battery the zinc of the amalgam unites with the electrolyte, forming zinc sulfate and liberating the mercury, which pass through the perforated inclosing supports E into the electrolyte, and are withdrawn with said electrolyte from the casing A through the outlet-passage C and the pipe C′, and are then recovered from the electrolyte by any suitable process not necessary to herein describe.

Each of the negative electrodes F of my chemical-electric generator or battery consists of a body of active material $f$ and an electrical conductor F′, provided with an inner inclosed chamber for receiving the body $f$ and constructed of suitable material, as carbon, which is formed with pores leading from the exterior face of the electrical conductor to the inner chamber thereof for permitting entrance of the electrolyte to said inner chamber. The active material $f$ consists, preferably, of peroxid of lead mixed with sulfuric acid for causing the same to become semifluid and for supplying a large amount of sulfate to the peroxid of lead, and thereby facilitating the chemical actions incidental to the discharge of my chemical-electric generator or battery.

The supports E and the adjacent electrical conductors F′ are separated by suitable insulating-pieces G, each consisting, preferably, of a substantially rectangular frame open at its lower portion for permitting entrance of the electrolyte between said supports E and electrical conductors F′. The supports E, electric conductors F′, and the insulating pieces or frames G between said parts are preferably secured together by suitable clamps G′, of any desirable construction, here illustrated as consisting of opposite sections or angularly-shaped bars $g\ g$ and adjusting-bolts $g'\ g'$. If formed of metal, the portions of the clamps submerged in the electrolyte must necessarily be coated with a suitable insulation.

Experience has demonstrated that a chemical-electric generator or battery of this construction is particularly practical and effective, but, as previously stated, I desire to mechanically renew or restore the generator or battery after the same has discharged a current for the designed length of time, and consequently the supports E are each formed with an inlet-opening E′ for permitting the entrance of fresh or additional amalgam, and the electrical conductors F′ are each formed with an opening $F^2$, leading from the inner chambers of said conductors, for permitting the withdrawal of the active material $f$ and the insertion of fresh active material within said chamber of the conductor. The openings E′ are preferably formed in the top of the substantially rectangular pieces or frames $e^2$ of the supports E, and the openings $F^2$ are usually formed in the bases of the electrical conductors F′.

In order to facilitate practical and effective entrance of fresh or additional amalgam within the supports E and the removal and insertion of the material within the electrical conductors F', suitable conduits E² and F³ are connected to the openings E' F². The conduit E² consists, preferably, of a main pipe E³, formed of suitable material and arranged above the supports E, and branch passages E⁴, secured to or provided upon said pipe and extending downwardly and laterally therefrom for registering with the openings E' in the supports E. As here illustrated the branch passages E⁴ are shown as formed separable from the main pipe E³ and as secured thereto by clamps E⁵.

The outer end of the conduit E² is suitably formed for permitting its detachable connection to a feed-conduit H at the station for renewing or restoring the chemical-electric generator or battery, and this feed-conduit H is provided with a flaring branch passage $h$ and a conveyer $h'$ for entering the main pipe E³ of the conduit E² and forcing the amalgam therethrough by pressure, so as to positively and effectively feed the same into the inclosing supports E. The conveyer $h'$ is provided with a crank $h^2$ or other device for effecting its rotation, and when the supports E are sufficiently filled the conveyer $h'$ is withdrawn from the main pipe E³, and said pipe is cleaned by any suitable means not necessary to herein illustrate or describe.

The conduit F³ is provided with branch passages F⁴, having their free ends arranged within the openings F², and when the chemical-electric generator or battery consists of a series of cells the conduits F³ are connected by a main pipe or conduit F⁵, having its projecting end, Fig. 5, suitably formed for permitting its detachable connection to a feed-conduit I, having a branch passage I', connected to a suitable pressure device, as a pump $i$, for forcing the active material through the feed-conduits I and the conduit F³ into the inner chambers of the electrical conductors F'. The conduit I may also be provided with a second branch passage I², connected to a suitable suction device $i^2$ for withdrawing through the conduits F³ I the active material $f$, chemically changed by the discharge of the chemical-electric generator or battery. The chemically-changed active material or oxid of lead may be conducted by a pipe $i^3$, leading from the suction device or pump $i^2$, to a suitable battery J, electrically connected to a generator J', and said material may then be restored to its active condition. When a series of cells are used for forming my chemical-electric generator or battery, the pipes or conduits E³ F⁵ may consist of a series of sections suitably connected together to permit of their ready detachment for preventing short-circuiting of the chemical-electric generator or battery.

It will now be readily apparent that my improved chemical-electric generator or battery is so constructed that fresh active material may be mechanically added or inserted within the inclosing supports E for supplying the waste or consumption thereof and that the chemically-changed active material or lead oxid may be mechanically withdrawn from the electrical conductors therefor and mechanically replaced with fresh active material, as lead peroxid. Said chemical-electric generator or battery is thus quickly renewed or restored to operative condition and rendered capable of immediate discharge without necessitating the waste of time heretofore required in electrically charging a battery or the chemical action upon the component parts of a battery resulting in impairment of its efficiency and decrease in its length of life.

No lead plates or grids are used in the construction of my chemical-electric generator or battery, and consequently there is no liability of loss in efficiency owing to sulfating of such plates or grids. Moreover, the fixed parts of the generator may be first assembled in operative position, and the metal amalgam and active material may then be readily inserted within the inclosing supports F and the electrical conductors F' therefor, thus reducing the time and cost necessitated in assembling or building the chemical-electric generator or battery, and the materials chemically changed by the discharge of said generator or battery may be recovered and renewed or restored to proper condition for reëntrance within said supports and electrical conductors, thus reducing to a minimum the expense for operating the chemical-electric generator or battery. The chemically-changed active material or lead oxid may also be renewed or restored as active material or lead oxid suitable for mechanical insertion within the chemical-electric generator or battery.

The operation of my invention will be readily perceived from the foregoing description and upon reference to the accompanying drawings, and it will be particularly noted that the same is highly efficient and is of such construction that when exhausted by the discharge of the current it may be economically renewed or restored by the mechanical removal of one or more of the materials chemically changed during the discharge of the current and the insertion of additional material or materials capable of such chemical change.

The construction of my chemical-electric generator or battery may be considerably varied, and hence I do not herein limit myself to such exact construction.

Having thus fully described my invention, what I claim as new, and desire to secure by Letters Patent, is—

1. The combination with an electrolyte-containing casing or shell, and a series of negative electrodes arranged within the casing or shell; of a series of positive electrodes interposed between the negative electrodes and each comprising an electrical conductor and an active material, inclosing supports for the positive electrodes interposed between the negative electrodes, and a conduit provided with a series of branch passages communicating with the inner chambers of the inclosing supports for discharging the active material therein, substantially as and for the purpose described.

2. The combination with an electrolyte-containing casing or shell, and a series of positive electrodes arranged within the casing or shell; of a series of negative electrodes interposed between the positive electrodes and each comprising a body of active material and an electrical conductor provided with an inner chamber for receiving the body of active material, said electrical conductors being formed with pores leading from their exterior faces to their inner chambers, and a conduit provided with a series of branch passages communicating with the inner chambers of the electrical conductors for conveying the active material into said chambers, substantially as and for the purpose specified.

3. The combination with an electrolyte-containing casing or shell, a series of positive electrodes arranged within the casing or shell and each comprising an electrical conductor and a metal amalgam, inclosing supports for the positive electrodes, and a conduit provided with a series of branch passages communicating with the inner chambers of the inclosing supports for discharging the metal amalgam therein; of a series of negative electrodes interposed between the inclosing supports of the positive electrodes and each comprising a body of active material, and an electrical conductor provided with an inner chamber for receiving the body of active material, said electrical conductors of the negative electrodes being formed with pores leading from their exterior faces to their inner chambers, and a conduit provided with a series of branch passages communicating with the inner chambers of the latter electrodes for conveying the active material into said chambers, substantially as and for the purpose set forth.

4. The combination with an electrolyte-containing casing or shell, and a series of positive electrodes arranged within the casing or shell; of a series of negative electrodes interposed between the positive electrodes and each comprising a body of active material and an electrical conductor provided with an inner chamber for receiving the body of active material, said electrical conductors being formed with pores leading from their exterior faces to their inner chambers, and a conduit having a portion thereof extending crosswise of the electrodes within the casing or shell, and provided with a series of branch passages communicating with the bases of said inner chambers of the negative electrodes, substantially as and for the purpose specified.

5. The combination with a positive electrode consisting of an electrical conductor and a metal amalgam; of an inclosing support for said metal amalgam provided with an inlet-opening for permitting the entrance of the metal amalgam, a conduit for conducting the metal amalgam to said inlet-opening, and a feeding device arranged within the conduit and movable therein, substantially as and for the purpose described.

6. The combination with a positive electrode, a non-electric-conducting inclosing support for the electrode, said support being provided with a perforated wall, and a non-electric-conducting filling for the perforations of said wall; of a negative electrode provided with a porous wall and an inner chamber, and active material arranged within said chamber, substantially as and for the purpose specified.

7. The combination with a positive electrode, and an inclosing support for the electrode; of a negative electrode consisting of an electrical conductor provided with an inner inclosed chamber and pores leading from its exterior face to the inner chamber, active material arranged within said chamber, and an insulating-piece between said support and said electrical conductor open at its lower portion, substantially as and for the purpose set forth.

8. The combination with a positive electrode consisting of an electrical conductor and a metal amalgam; of an inclosing support for the positive electrode, a negative electrode consisting of an electrical conductor provided with an inner chamber and pores leading from its exterior face to the inner chamber, a filling of an oxid of a metal arranged within said chamber, and an insulating-piece between said support and electrical conductor open at its lower portion, substantially as and for the purpose described.

In testimony whereof I have hereunto signed my name, in the presence of two attesting witnesses, at Syracuse, in the county of Onondaga, in the State of New York, this 24th day of March, 1894.

HENRY K. HESS.

Witnesses:
CLARK H. NORTON,
K. H. THEOBALD.

It is hereby certified that in Letters Patent No. 592,782, granted November 2, 1897, upon the application of Henry K. Hess, of Syracuse, New York, for an improvement in "Chemical Electric Generators," errors appear in the printed specification requiring correction as follows: In lines 73 and 74, page 1, the word "arranged" should read *inserted*, and in line 75, same page, the word "inserted" should read *arranged;* and line 44, page 3, the compound word "feed-conduits" should read *feed-conduit*, and same line and page the word "conduit" should read *conduits;* and that said Letters Patent should be read with these corrections therein that the same may conform to the record of the case in the Patent Office.

Signed, countersigned, and sealed this 16th day of November, A. D., 1897.

[SEAL.]

WEBSTER DAVIS,
*Assistant Secretary of the Interior.*

Countersigned:
    A. P. GREELEY,
        *Acting Commissioner of Patents.*